United States Patent [19]

Stanford

[11] 4,040,043
[45] Aug. 2, 1977

[54] FILM SENSING APPARATUS
[75] Inventor: Arthur Stanford, Richmond, Va.
[73] Assignee: AMF Incorporated, White Plains, N.Y.
[21] Appl. No.: 670,795
[22] Filed: Mar. 26, 1976
[51] Int. Cl.² .............................................. G08B 21/00
[52] U.S. Cl. ........................................ 340/259; 53/78; 226/37; 242/57; 242/75.43
[58] Field of Search .............. 340/259; 53/78; 226/11, 226/37, 100; 242/189, 57, 75.43, 84.52 A

[56] References Cited
U.S. PATENT DOCUMENTS

| 3,202,376 | 8/1965 | Dutro et al. | 242/75.43 |
| 3,492,732 | 2/1970 | Heiler et al. | 340/259 |
| 3,913,855 | 10/1975 | Heimlicher et al. | 242/75.43 |

Primary Examiner—Glen R. Swann, III
Attorney, Agent, or Firm—George W. Price; Charles J. Worth

[57] ABSTRACT

As film is being drawn off a rotatable supply reel, an apparatus indicates the presence of a predefined amount of film material remaining on the reel. In the absence of a designated quantity present on the film reel, a sensing device in proximity to the reel imparts a signal to a reel braking device for de-energizing the film roller. When the braking device moves to engage the film reel, an additional sensing device responds to the angular displacement between the brake and the film reel during braking action to monitor film tension.

2 Claims, 3 Drawing Figures

FILM SENSING APPARATUS

BACKGROUND OF INVENTION

The present invention is directed to an apparatus for signalling the depletion of packaging film material at a pre-determined quantity level. More particularly, the present invention is directed to an apparatus and associated electrical circuitry for monitoring the amount of film left on the supply rolls so that an operator will be alerted to replenish the film supply before the film runs out as the product being packaged is being processed.

During a packaging operation in which product is advanced to a packing station along an endless conveyor belt, the use of packaging films and the amount remaining at a given time during the packaging operation is monitored so as to permit the operator to replenish the packaging material without the loss of goods being processed, due to insufficient packaging material. Obviously, a failure to have sufficient packaging material on hand can result in machine down-time and loss of product.

On packaging machines of the type known to the prior art as, for example, shown in U.S. Pat. No. 3,503,175, the film supplies are monitored by mercury switches disposed on counter balanced film sensing fingers. These sensing fingers are wired in series with the main motor drive control, with the result that if either top or bottom film supply is depleted, a mercury switch is caused to move and the machine is de-energized until the operator places a fresh roll of packaging material into the manufacturing line. Unfortunately, with the aforementioned type of system, the machine operator is unaware of the film depletion until it actually occurs; that is, there is no warning and once such an occurrence takes place, the machine shuts off with the result that product to be packaged accumulates until the operator places a fresh supply of packaging material on stream and re-energizes the machine. With machines of this type, the rate at which product was handled was sufficiently low in some instances so as not to cause a serious problem at the time the packaging machine was de-energized due to a lack of packaging film. However, with an increase in the amount of product throughput and the resultant high speeds of operation, machine shutdown due to insufficient supplies of packaging material can be catastrophic, with the result that the operator had to hand feed loose and disorganized product into the production line so as to correct the aforementioned problem.

SUMMARY OF INVENTION

It is the main object of the present invention to overcome the defects of the prior art.

It is still a further object of the present invention to provide an alarm system, warning the operator that the available supply of film is sufficiently low to warrant replenishment.

Still a further object of the present invention is to provide a control alarm system for monitoring the amount of film at both the upper and lower lines of travel having sufficient sensitivity to warn the operator of a depletion while maintaining the packaging apparatus in the on mode.

The principle feature of the present invention is directed to a film sensing apparatus for indicating the presence of a predefined amount of film remaining on a film supply reel mounted on a rotatable spindle, said reel being adapted to continuously dispense film being drawn in a forward direction, including: sensing means disposed in proximity to said reel, actionable in response to a predefined quantity of film on said reel; brake means co-acting with respect to said sensing means for moving and de-energizing said film roll spindle in the absence of a designated film quantity as sensed by said sensing means; and film tension sensing means disposed in proximity to said film being drawn from said film spindle for governing angular displacement between said brake means and said film spindle means as said spindle means co-acts with said brake means.

Also within the scope of the present invention is an apparatus, whereby, angular movement of said film tension sensing means with respect to said film being drawn from said spindle means being defined by the quantity of film remaining on the film supply reel, whereby, movement of said brake means in an upward direction being effected in response to movement of said sensing means, and causing said film spindle to produce angular oscillatory movement of said sensing means together with angular deflection due to film depletion.

Still other objects and advantages of the present invention will be more fully understood with respect to specification, claims and drawings.

DESCRIPTION OF THE PREFERRED EMBODIMENT

In accordance with the present invention, the alarm system is employed in conjunction with a high speed packaging apparatus capable of handling an excess of twice as many units of product as compared to conventional prior art packaging machines. Obviously, to have such a system de-energized without warning creates a most undesirable condition. Furthermore, running at such high speeds makes it imperative that the system not be stopped without some previous warning.

Figure 1:
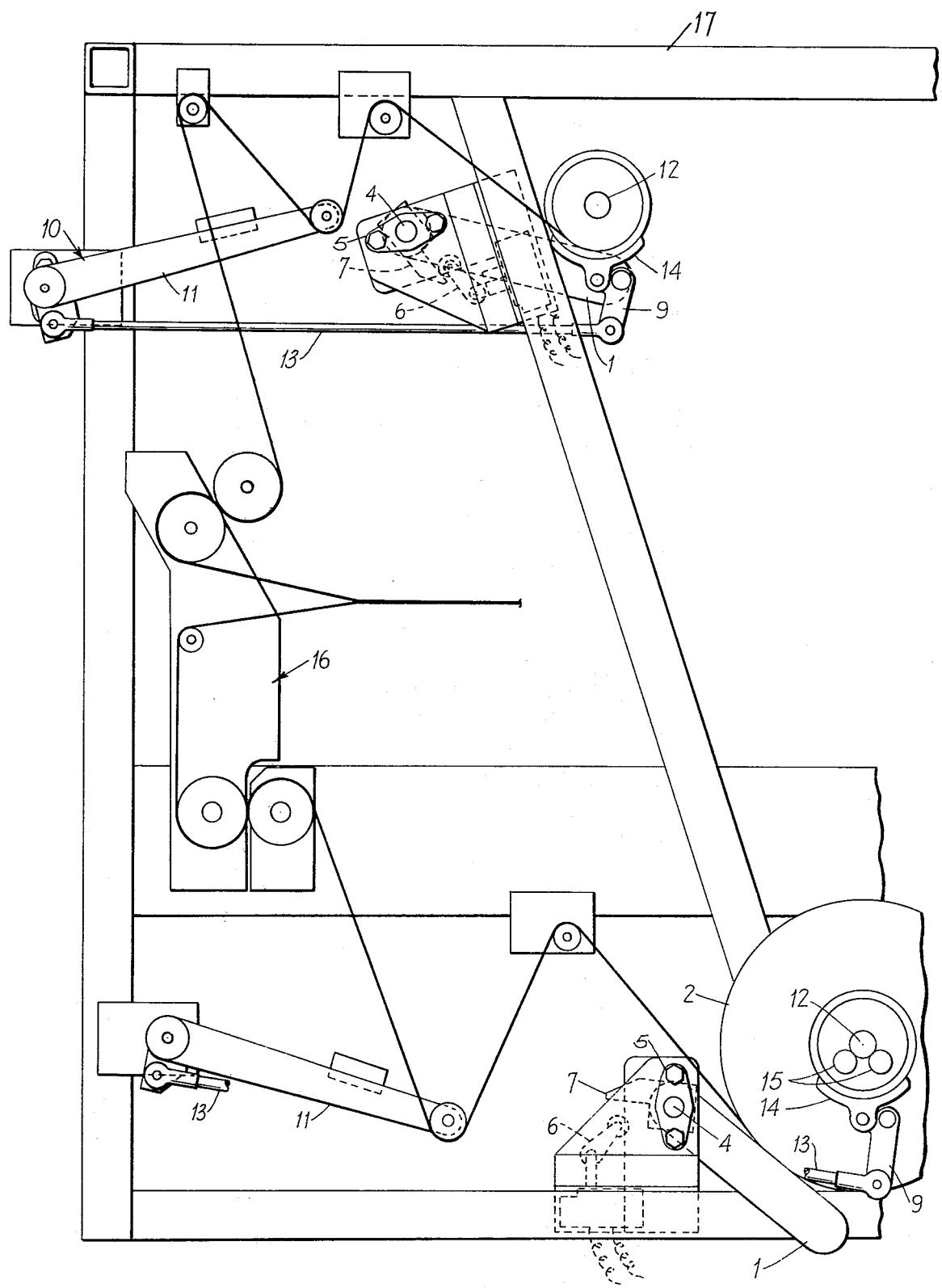
FIG. 1 is a side sectional elevation of the inventive assembly.
Figure 2:
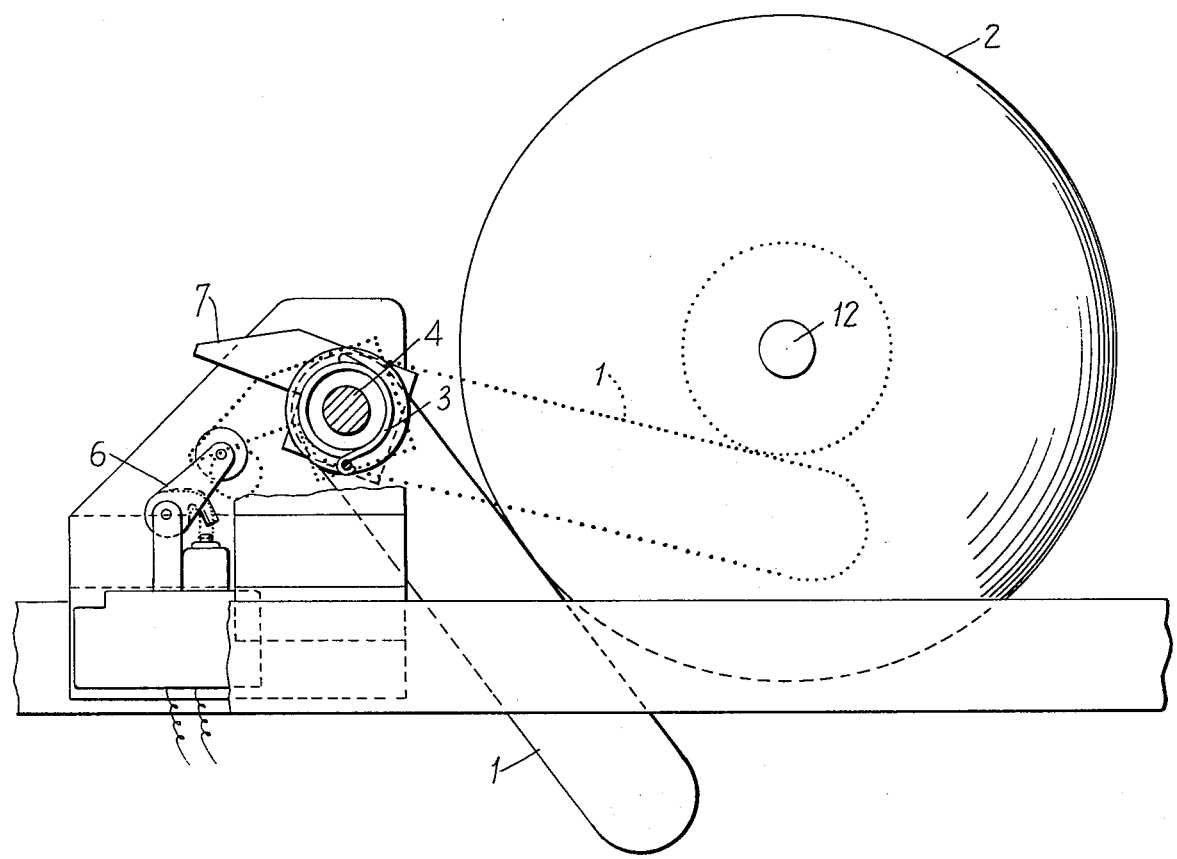
FIG. 2 is a side elevational view of the film sensing assembly.
Figure 3:
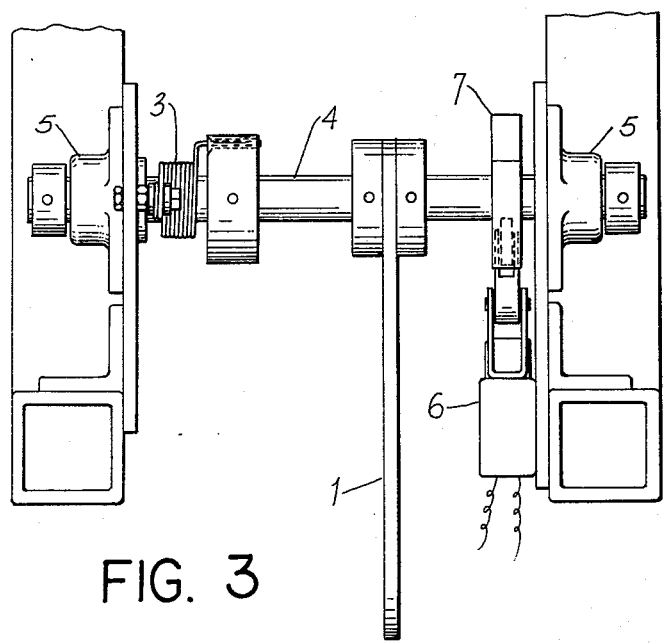
FIG. 3 is an end view of FIG. 2.

As shown in FIG. 1, the sensing assembly of the invention employs a sensing arm 1 disposed and resting against the outer surface of a roll of film 2, which is held in place by a helical spring 3 (FIG. 3) and is rotatable about a shaft 4 supported by bearing supports 5 which supports and locates a micro switch 6. A switch trip 7 is fastened to the shaft 4 and as the film 2 is depleted, the sensor arm 1 rotates the shaft 4. The trip 7 actuates the micro switch 6 as the film roll 2 is depleted and attains a pre-determined diameter, and energizes a warning device which could be a light bulb, a flashing light bulb, a rotating light unit, a bell, a buzzer or a horn mounted on or near the packaging apparatus so as to warn the operator that the film supply is low. Thereafter, when the film roll 2 reaches the pre-determined diameter (see FIGS. 1 & 2) and film is drawn from the roll, the warning device will remain actuated for a longer duration until a predefined length of film has been removed and remains in the actuated position until the roll 2 is replaced.

The release of film from each of the supply rolls 2 is controlled by a brake assembly 9 and a slack stick assembly 10. When film is not being advanced to the packing apparatus, a slack stick 11 is in the down position and the brake assembly 9 asserts an upward thrust against the film roll arbor 12 through a tie bar member 13. This action lifts the film roll arbor 12 out of its cradle on the end to which a brake shoe 14 of assembly 9 is applied. The sensor arm 1 is located at the same end in order to take advantage of this motion. It follows when film 2 is called for by the packaging apparatus, the slack stick 11 is lifted until the brake 14 is released from the film arbor 12, lowering the arbor 12 to its cradle 15 and allowing it to rotate and release the film 2. It is the up and down motion of the roll of film 2 that causes the warning device 8 to actuate on and off and provides the operator a warning of increasing duration until the warning device stays on steady, at which point the operator receives the warning signal; i.e. the amount of film left on the supply roll is monitored enabling the replenishment to take place with the minimum of down time and before the film runs out and while product is being processed.

In effect, what occurs in the operation is that at the start of the cycle at which a time product is to be wrapped, tension is applied to the film 2 by the film feeder 16 of the wrapping machine 17, enabling the slack bar 11 to pivot in one direction to an angular position in which the brake 9 moves out of engagement with the film roll arbor 12 containing the film 2. Once this occurs, one end thereof is lowered to a horizontal position thereby freeing the film roll 2 for rotation and allowing the required amount of film to be unspooled and advanced from the reel. At a point in time when the film feeder 16 has drawn sufficient film, a resultant decrease in tension on the film 2 allows the slack bar 11 to pivot in the opposite direction to an angular position at which time the brake 9 moves into engagement with roll film arbor 12, thereby raising the one end of the film roll 2 and precluding further film feed.

The angular position of the sensor arm 1 depends primarily on the quantity of film remaining on the roll 2. A second order effect is exerted on the sensor arm 1, however, by reason of the operation of the brake 9 which imparts a pitching movement to the roll film arbor 12, each time the film feeder 16 draws film, such pitching movement constitutes a modulating angular oscillation of the sensor arm 1 superimposed on the angular deflection due to depletion of the film from roll 2. As film is drawn from the roll, a point is reached where the deflection of the sensor arm 1, due to engagement of the roll film arbor 12 by the brake 9, is sufficient to actuate the micro switch 6 and energize the warning device. The switch remains actuated only to the next cycle of operation when the brake 9 disengages the roll film arbor 12. Thus, the warning device is energized for a number of cycles of operation of the film feeder 16 until the quantity of film remaining on the reel is such that the sensor arm 1 maintains the switch 6 energized even when the brake 9 is disengaged from the roll film arbor 12. The warning device begins to be actuated when the quantity of film remaining on a roll 2 reaches a first amount and is actuated continuously after a further incremental reduction in the remaining film 2.

The invention gives rise to a new and improved two stage warning apparatus where the first stage is in the form of a pulsating indicator and the second stage is a continuously activated indicator. The operation affording the two stage system arises out of periodic lifting of the roll film arbor 12 in combination with the film sensor arm 1.

Although we have disclosed herein the preferred practice of our invention, we intend to cover as well as any change or modification therein which may be made without departing from the spirit and scope of the invention.

What I claim:

1. A film sensing apparatus for indicating the presence of a predefined amount of film remaining on a film supply reel, said reel being adapted to continuously dispense film from a freely moving film roll spindle for controlled movement of said spindle, supported at each end upwardly and downwardly, including: supply sensing means disposed in proximity to said reel, responsive to a predefined quantity of film on said reel, said supply sensing means being defined by a sensing arm in contact with said film roll responsive to upward and downward movement of said spindle; brake means for engaging said film roll spindle in the absence of a designated film tension; and film tension sensing means disposed in proximity to said film being drawn from said film supply reel for governing movement between said brake means and said film spindle, said film tension sensing means moving angularly with respect to said film being drawn from said film supply reel in response to the tension of the film, said brake means movement in an upward direction being responsive to movement of said film tension sensing means in a downward direction, causing said film spindle to de-accelerate responsive to decreased tension and said tension sensing means to reverse its angular movement to urge said brake downward for disengagement from said spindle, permitting said spindle to travel upwardly and downwardly in an oscillatory manner.

2. An apparatus as claimed in claim 1, wherein: a film depletion condition is recognized in response to the position of said sensing arm contacting said film supply reel; a film depletion condition first being attained intermittently in response to the presence of a first quantity of film on said reel by oscillatory spindle movement and later attained continuously by further film depletion whereby said arm contacting said supply reel does not follow oscillations of said spindle.

* * * * *